US010018054B2

(12) United States Patent
Verrilli et al.

(10) Patent No.: US 10,018,054 B2
(45) Date of Patent: Jul. 10, 2018

(54) FABRICATION OF GAS TURBINE ENGINE COMPONENTS USING MULTIPLE PROCESSING STEPS

(71) Applicant: General Electric Company, Schenectady, NY (US)

(72) Inventors: Michael J. Verrilli, Loveland, OH (US); Mark Eugene Noe, West Chester, OH (US); Mark Willard Marusko, Springboro, OH (US); Paul Izon, Morrow, OH (US); Robert Tyler, Harrison, OH (US); Christopher Hasse, Kenwood, OH (US)

(73) Assignee: General Electric Company, schenectady, NY (US)

( * ) Notice: Subject to any disclaimer, the term of this patent is extended or adjusted under 35 U.S.C. 154(b) by 306 days.

(21) Appl. No.: 14/921,023

(22) Filed: Oct. 23, 2015

(65) Prior Publication Data
US 2017/0114649 A1    Apr. 27, 2017

(51) Int. Cl.
*F01D 5/14* (2006.01)
*F01D 5/28* (2006.01)
(Continued)

(52) U.S. Cl.
CPC .......... *F01D 5/282* (2013.01); *C04B 35/6269* (2013.01); *C04B 37/001* (2013.01);
(Continued)

(58) Field of Classification Search
CPC . F01D 5/282; F01D 5/147; F01D 5/30; F01D 11/00; C04B 37/001;
(Continued)

(56) References Cited

U.S. PATENT DOCUMENTS

| 5,382,148 A | 1/1995 | Buckley |
| 7,510,379 B2 | 3/2009 | Marusko et al. |

(Continued)

FOREIGN PATENT DOCUMENTS

| EP | 1884623 A2 | 2/2008 |
| EP | 2728125 A1 | 5/2014 |

OTHER PUBLICATIONS

Extended European Search Report and Opinion issued in connection with corresponding EP Application No. 16194808.8 dated Mar. 6, 2017.

*Primary Examiner* — Jun Yoo
(74) *Attorney, Agent, or Firm* — General Electric Company; William Andes

(57) ABSTRACT

Methods for fabricating a component of a gas turbine engine are provided. In one embodiment, the method includes molding a CMC material to form a first portion of the gas turbine engine component, processing the first portion to form a first assembly, preparing the first assembly and a second portion of the gas turbine engine component for processing, and processing the first assembly and second portion to form a second assembly. In another embodiment, the method includes processing a first plurality of CMC plies to form a first assembly; positioning the first assembly and a second plurality of CMC plies on a tool for processing, the first assembly defining a first plane, the second plurality of plies defining a second plane, wherein the second plane is perpendicular to the first plane; and processing the first assembly and the second plurality of plies to form a second assembly.

20 Claims, 10 Drawing Sheets

(51) Int. Cl.
*C04B 35/626* (2006.01)
*C04B 37/00* (2006.01)
*F01D 5/30* (2006.01)
*F01D 11/00* (2006.01)

(52) U.S. Cl.
CPC .............. *F01D 5/147* (2013.01); *F01D 5/30* (2013.01); *F01D 11/00* (2013.01); *C04B 2235/602* (2013.01); *C04B 2235/604* (2013.01); *C04B 2237/38* (2013.01); *F05D 2220/32* (2013.01); *F05D 2230/21* (2013.01); *F05D 2230/60* (2013.01); *F05D 2240/30* (2013.01); *F05D 2300/6033* (2013.01)

(58) Field of Classification Search
CPC .......... C04B 35/6269; C04B 2235/602; C04B 2237/38; C04B 2235/604; F05D 2300/6033; F05D 2230/21; F05D 2240/30; F05D 2220/32; F05D 2230/60
See application file for complete search history.

(56) References Cited

U.S. PATENT DOCUMENTS

| | | |
|---|---|---|
| 7,799,405 B1 | 9/2010 | Vance et al. |
| 8,715,561 B2 | 5/2014 | Levers et al. |
| 2010/0081556 A1 | 4/2010 | Heng et al. |
| 2011/0027098 A1 | 2/2011 | Noe et al. |
| 2014/0193577 A1 | 7/2014 | Monaghan et al. |
| 2014/0301850 A1 | 10/2014 | Garcia Crespo |

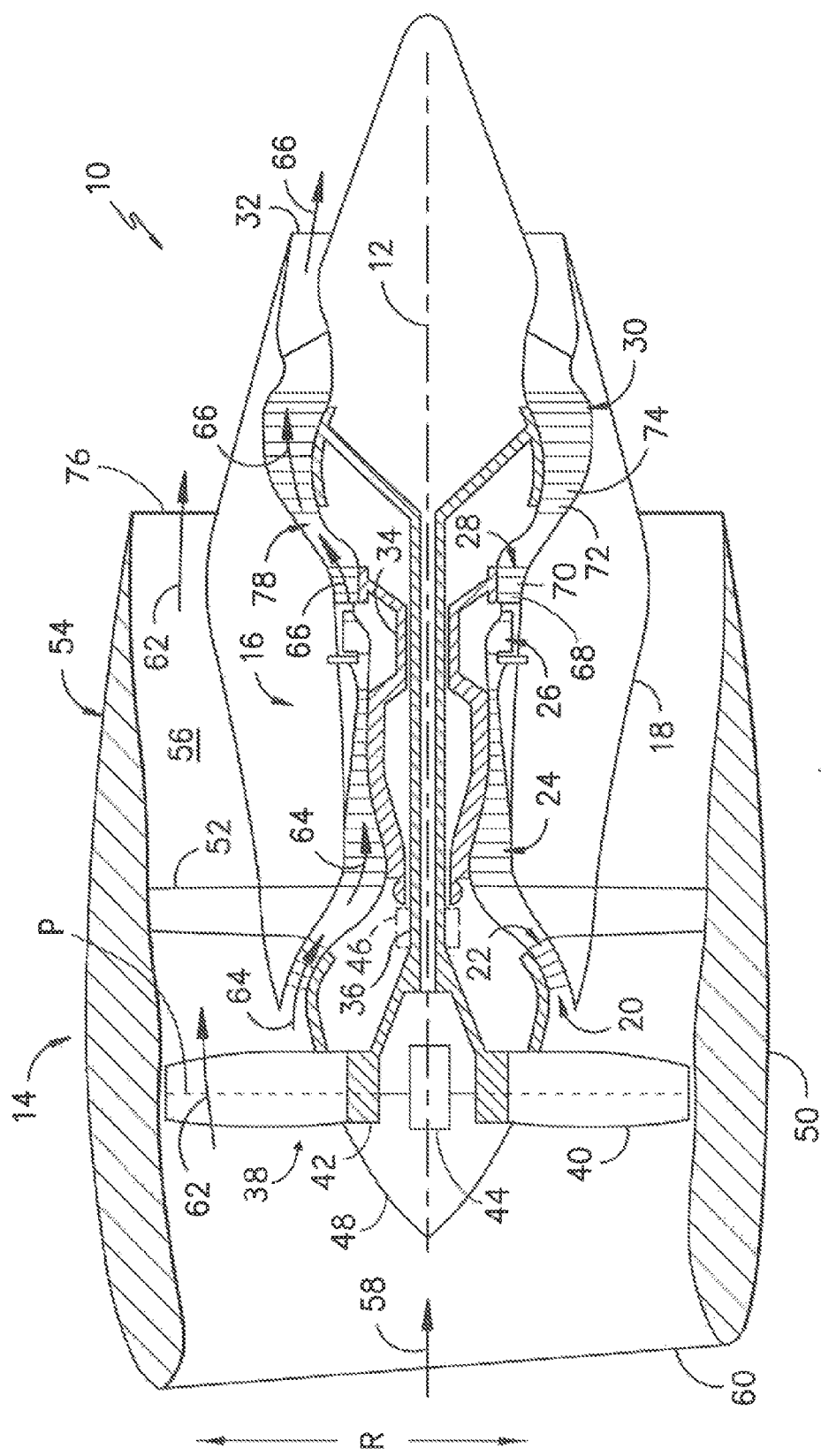
FIG. -1-

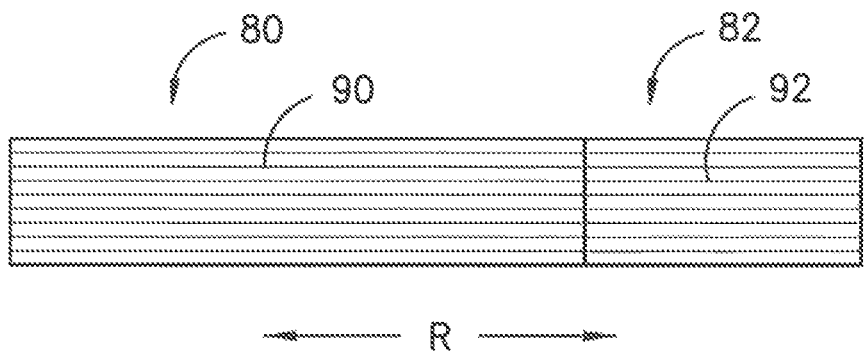
FIG. -2-
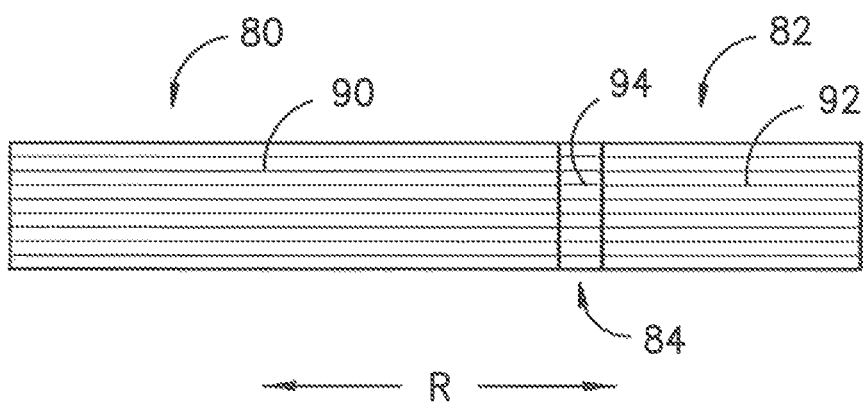
FIG. -3-

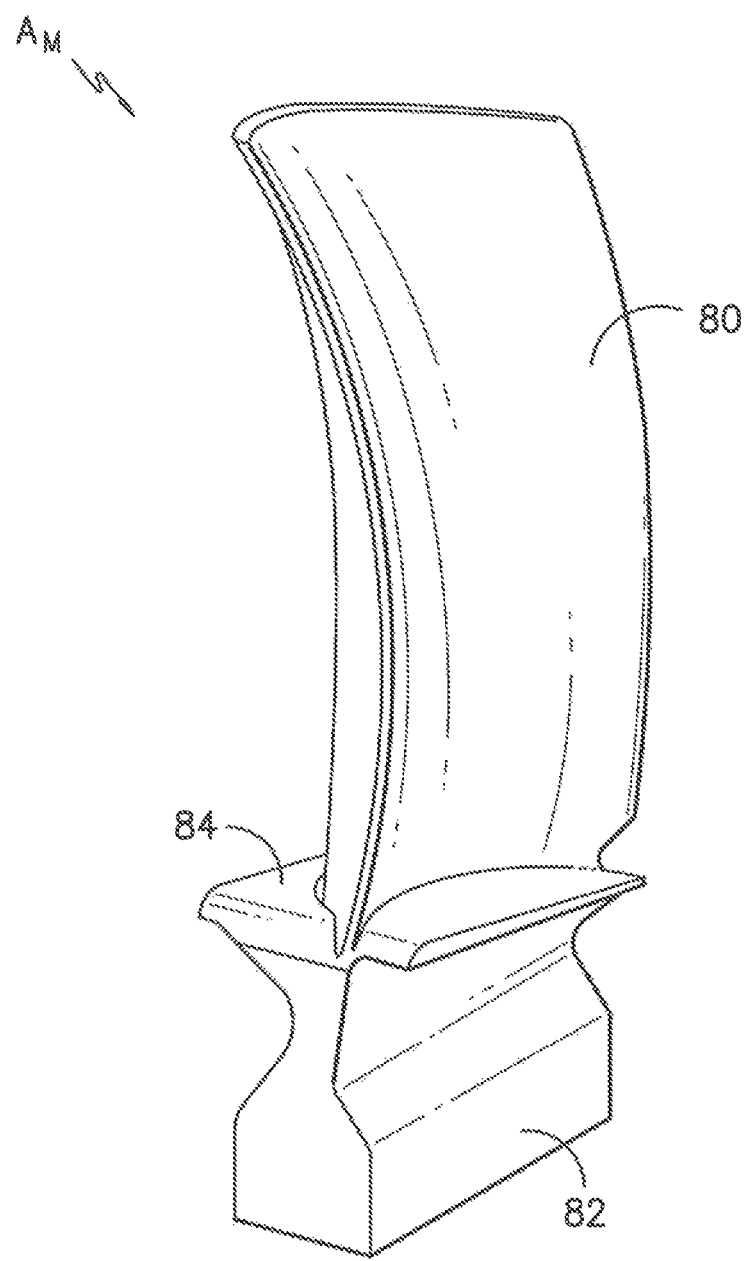
FIG. -4-

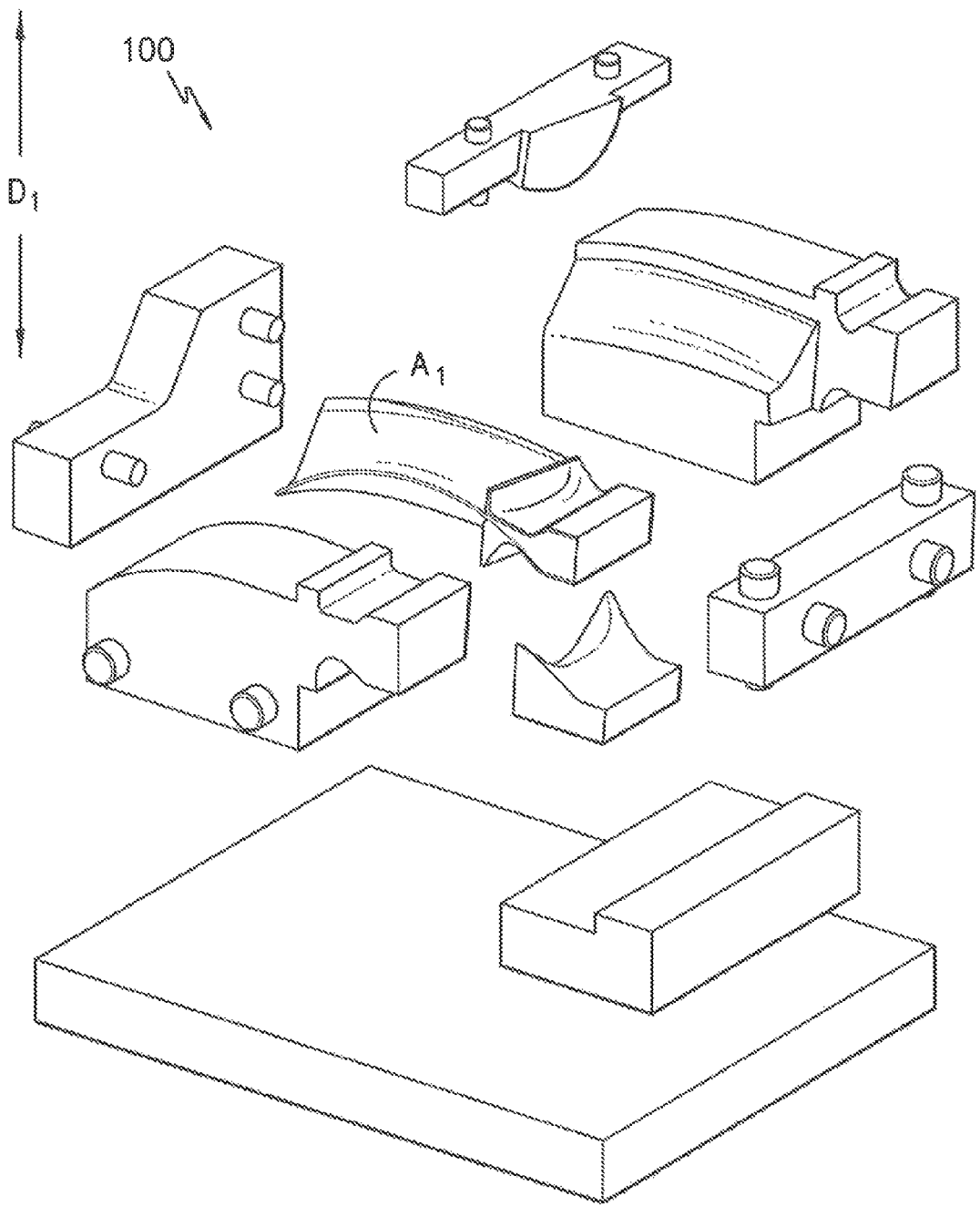
FIG. —5—

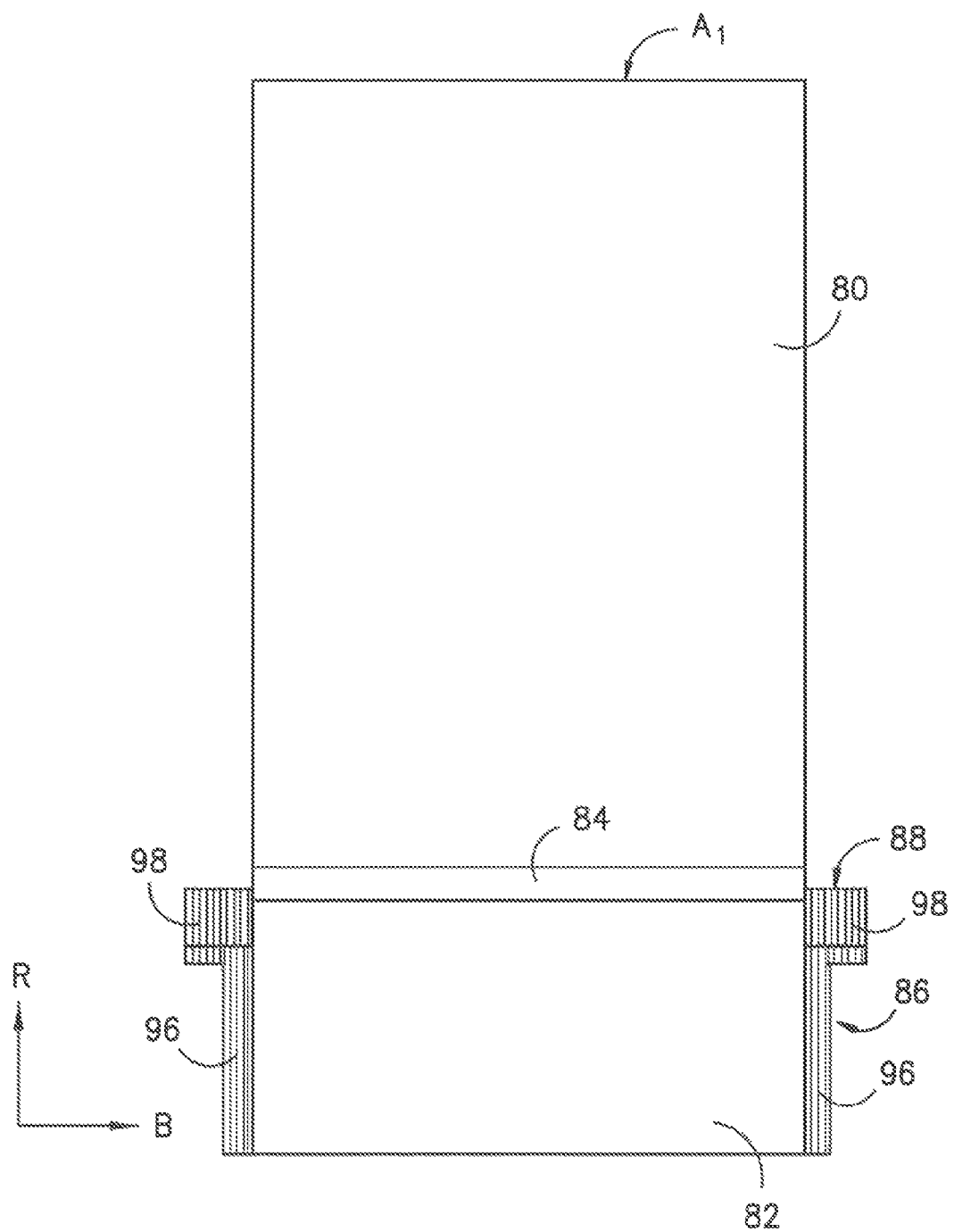
FIG. -6-

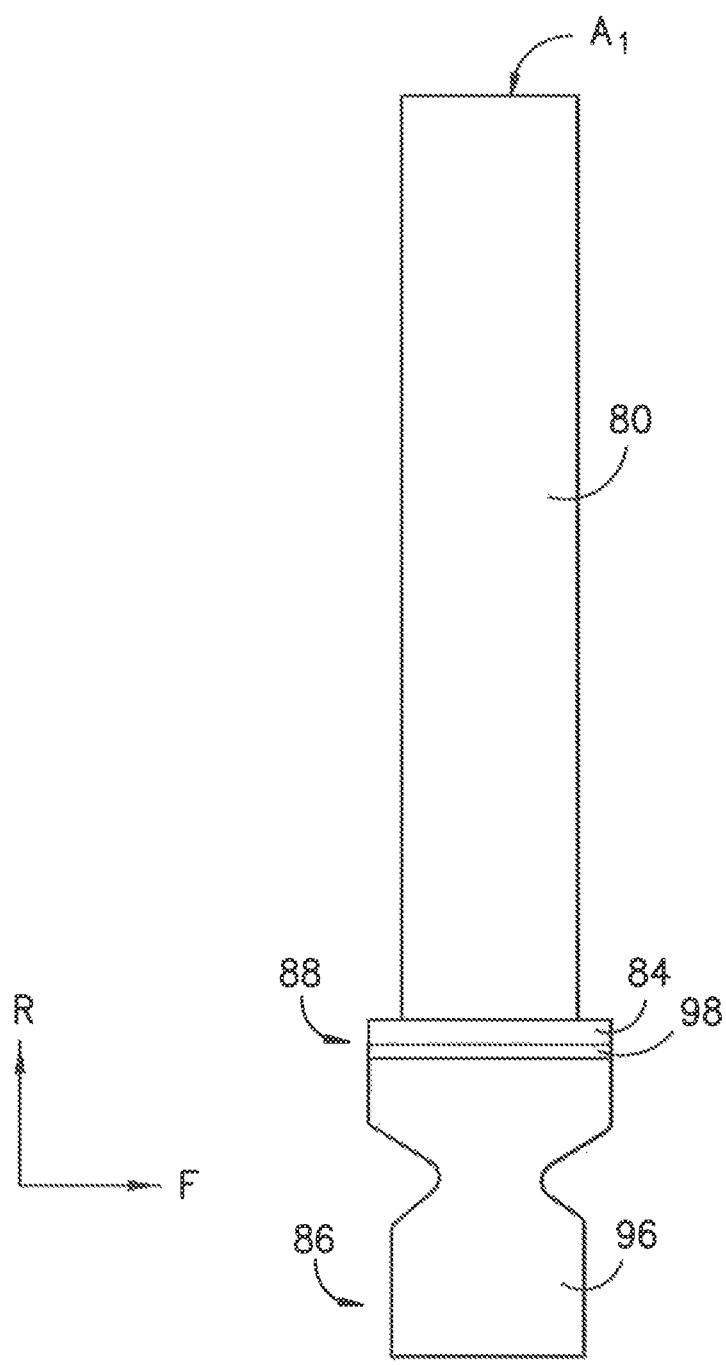
FIG. −7−

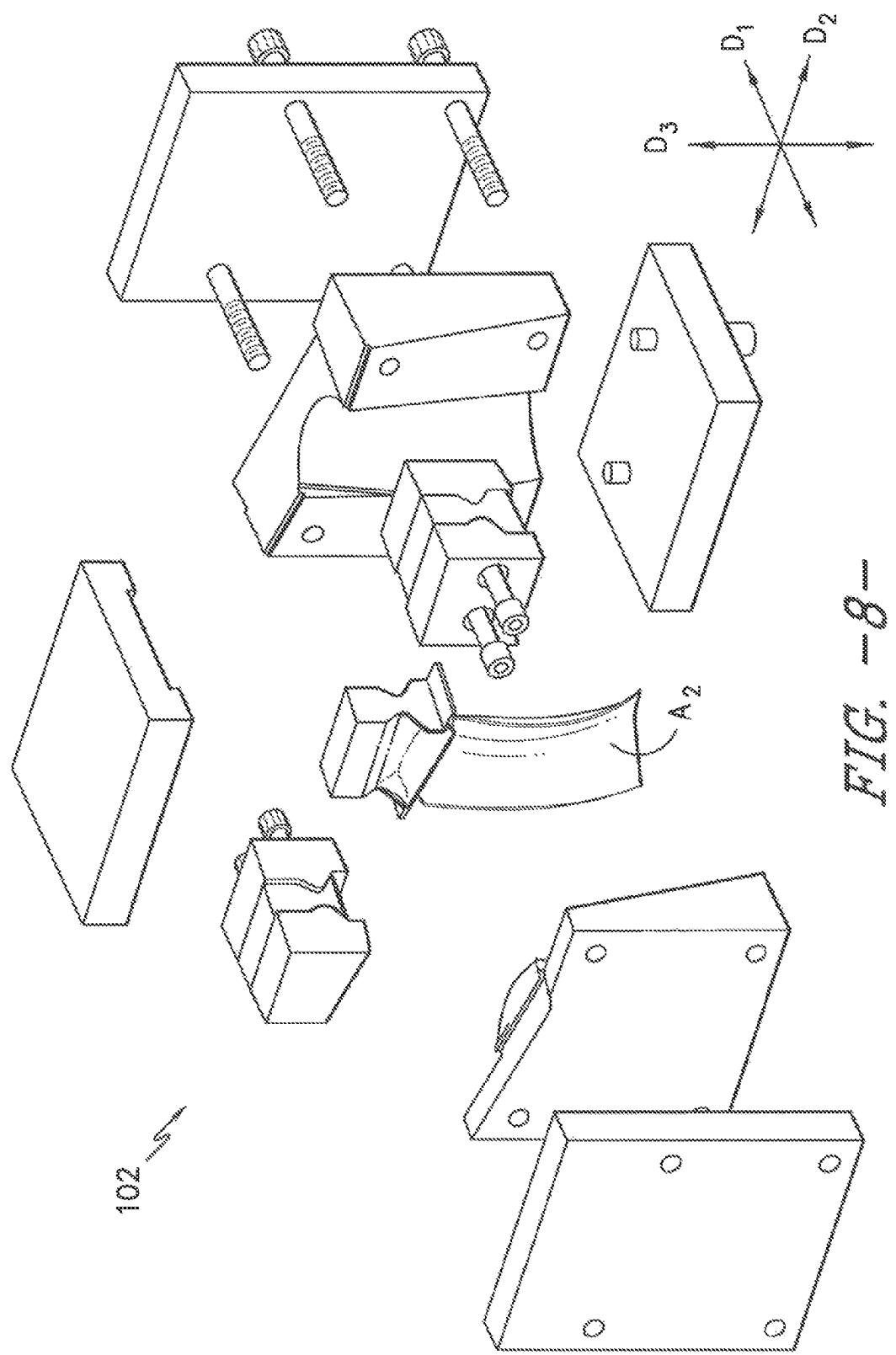
FIG. -8-

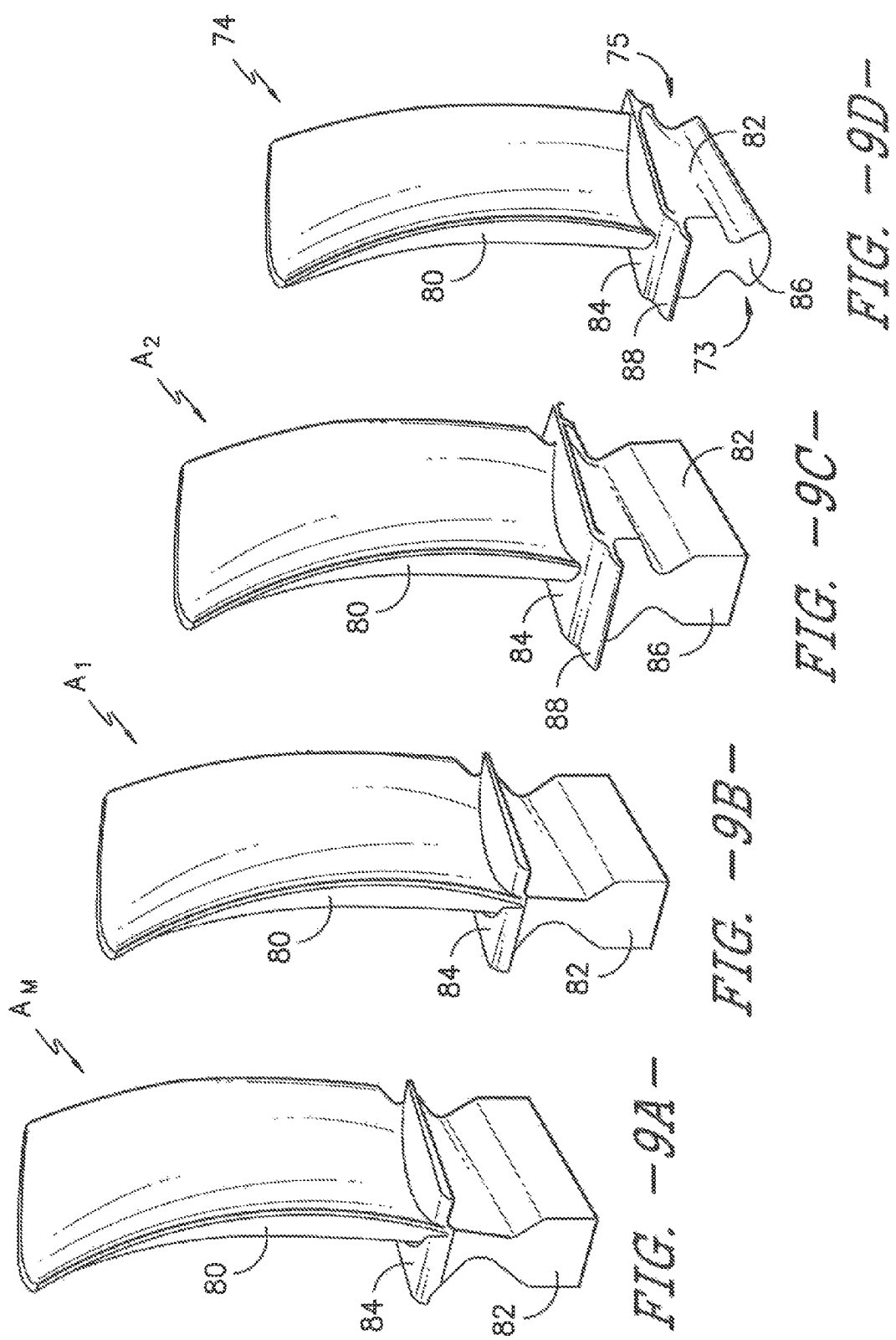

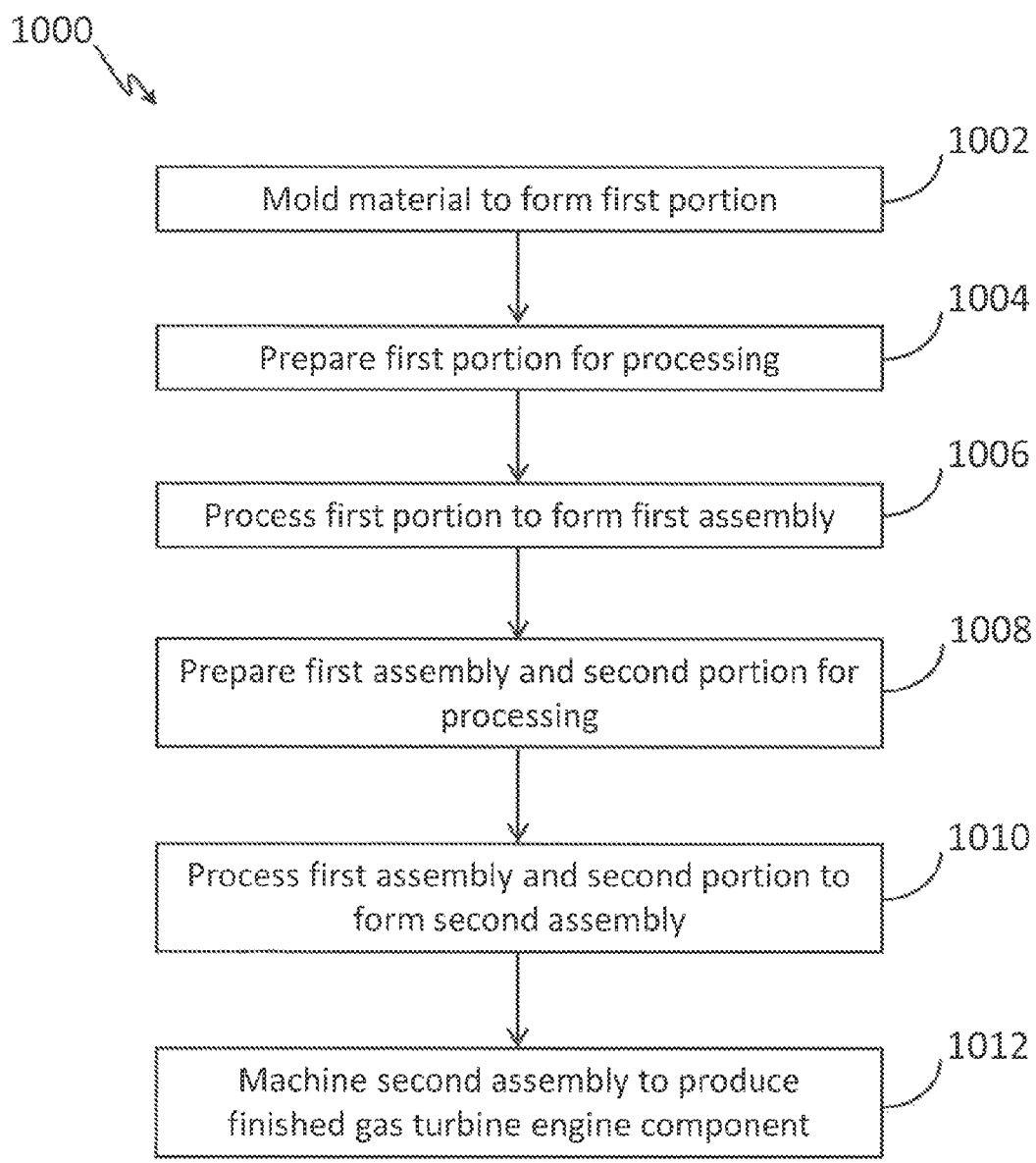
FIG. -10-

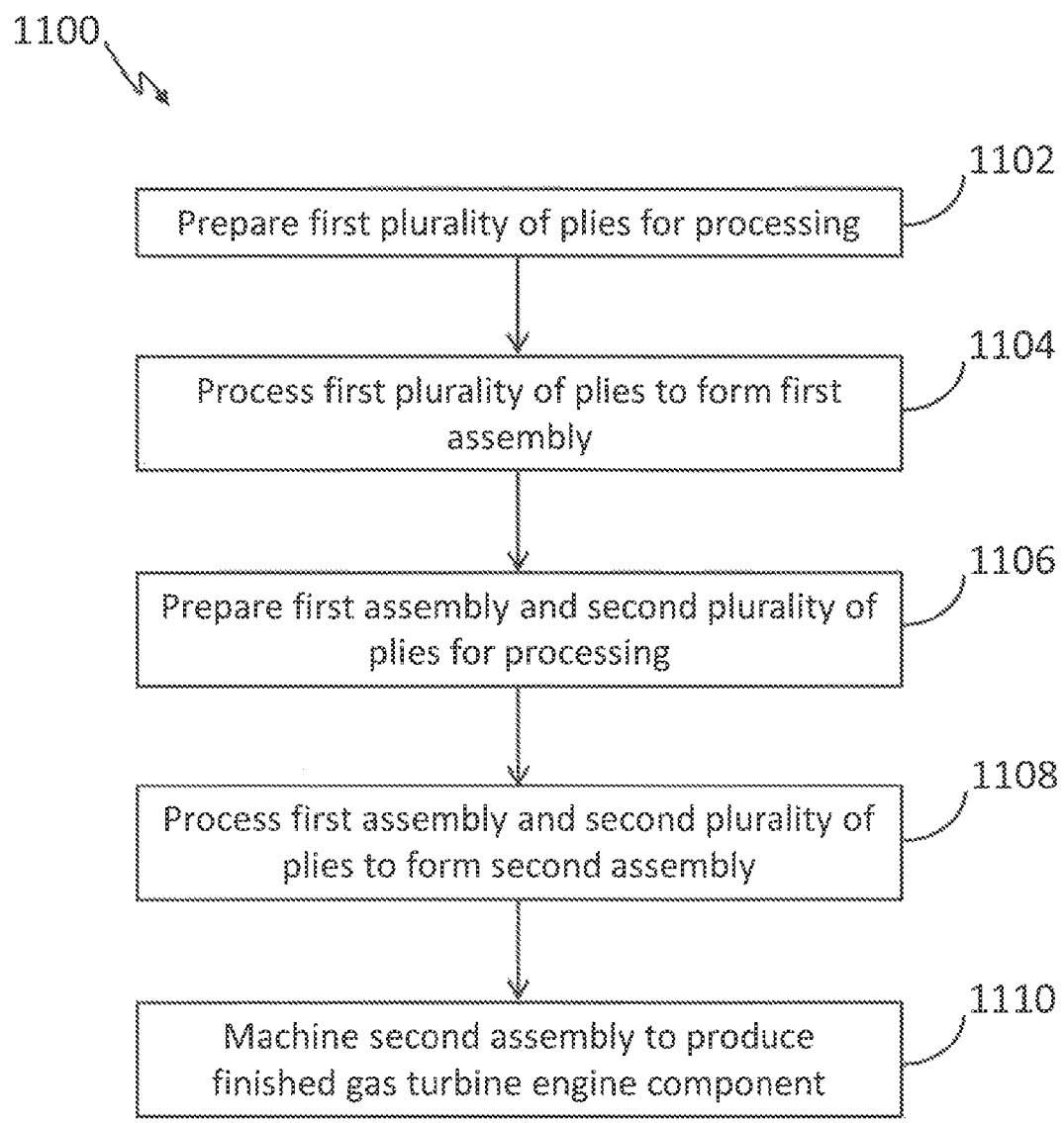
FIG. -11-

FABRICATION OF GAS TURBINE ENGINE COMPONENTS USING MULTIPLE PROCESSING STEPS

FEDERALLY SPONSORED RESEARCH

This invention was made with government support under contact number N00421-05-C-0053 of the Department of the Navy. The government may have certain rights in the invention.

FIELD OF THE INVENTION

The present subject matter relates generally to a gas turbine engine, or more particularly to a method for fabricating components of a gas turbine engine. Most particularly, the present subject matter relates to a method for forming ceramic matrix composite blades of a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More commonly, non-traditional high temperature materials, such as ceramic matrix composite (CMC) materials, are being used for various components within gas turbine engines. For example, given an ability for CMC materials to withstand relatively extreme temperatures, there is particular interest in replacing components within the flow path of the combustion gases with CMC materials. More particularly, there is interest in replacing rotor blades of the turbine section of the gas turbine engine with blades formed of CMC materials.

CMC turbine rotor blades generally are formed from a plurality of plies of CMC material. The plies may be divided into segments, with each segment corresponding to a portion of the rotor blade. For example, one segment of plies may correspond to an airfoil portion of the blade, one segment of plies may correspond to a dovetail portion of the blade, and so forth for different portions of the turbine rotor blade. The segments of plies may be processed in an autoclave to compact and cure the plies to form the turbine rotor blade.

However, typical rotor blades have plies in three dimensions, e.g., plies in some segments of a blade have a first ply direction and plies in other segments of the blade have a second ply direction, e.g., normal to the first ply direction. Compaction of such a blade having plies in three dimensions can be difficult, as the plurality of plies of the blade are not oriented in the same ply direction.

Accordingly, a method for fabricating a gas turbine engine component utilizing multiple processing steps would be useful. Further, a method for forming a component of a gas turbine engine having plies in three dimensions would be beneficial. More particularly, a method for fabricating a turbine rotor blade of a gas turbine engine, the turbine rotor blade having CMC plies in three dimensions, would be particularly advantageous.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a method for fabricating a ceramic matrix composite component of a gas turbine engine is provided. The method includes molding a ceramic matrix composite material to form a first portion of the gas turbine engine component; processing the first portion of the gas turbine engine component to form a first assembly; preparing the first assembly and a second portion of the gas turbine engine component for processing; and processing the first assembly and second portion of the gas turbine engine component to join the first assembly and the second and thereby form a second assembly.

In another exemplary embodiment of the present disclosure, a method for fabricating a ceramic matrix composite component of a gas turbine engine is provided. The method includes processing a first plurality of plies of a ceramic matrix composite material to form a first assembly; positioning the first assembly and a second plurality of plies of a ceramic matrix composite material on a tool for processing the first assembly and the second plurality of plies, the first assembly defining a first plane, the second plurality of plies defining a second plane, wherein the second plane is perpendicular to the first plane; and processing the first assembly and the second plurality of plies to join the first assembly and the second plurality of plies and thereby form a second assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross-sectional view of an exemplary gas turbine engine according to various embodiments of the present subject matter.

FIG. 2 is a schematic side view of a plurality of airfoil plies and dovetail plies for a turbine rotor blade according to an exemplary embodiment of the present subject matter.

FIG. 3 is a schematic side view of a plurality of airfoil plies, dovetail plies, and platform plies for a turbine rotor blade according to an exemplary embodiment of the present subject matter.

FIG. 4 is a perspective view of a molded assembly for a turbine rotor blade, including an airfoil portion, a dovetail portion, and a platform portion, according to an exemplary embodiment of the present subject matter.

FIG. 5 is an exploded view of a first layup tool and a first assembly of a turbine rotor blade according to an exemplary embodiment of the present subject matter.

FIG. 6 is a schematic view of a plurality of angel wing plies and flowpath plies stacked up with a first assembly for a turbine rotor blade according to an exemplary embodiment of the present subject matter.

FIG. 7 is another schematic view of the plurality of angel wing plies and flowpath plies stacked up with the first assembly for a turbine rotor blade.

FIG. 8 is an exploded view of a second layup tool and a second assembly of a turbine rotor blade according to an exemplary embodiment of the present subject matter.

FIG. 9A is a perspective view of a molded assembly of a turbine rotor blade according to an exemplary embodiment of the present subject matter.

FIG. 9B is a perspective view of a first assembly of a turbine rotor blade according to an exemplary embodiment of the present subject matter.

FIG. 9C is a perspective view of a second assembly of a turbine rotor blade according to an exemplary embodiment of the present subject matter.

FIG. 9D is a perspective view of a machine finished turbine rotor blade according to an exemplary embodiment of the present subject matter.

FIG. 10 provides a chart illustrating a method for fabricating a component of a gas turbine engine in accordance with an exemplary embodiment of the present subject matter.

FIG. 11 provides a chart illustrating another method for fabricating a component of a gas turbine engine in accordance with an exemplary embodiment of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Referring now to FIG. 9D, an exemplary LP turbine rotor blade 74 is illustrated, the blade 74 having a forward side 73 and an aft side 75 and including an airfoil 80, a dovetail 82, a platform 84, opposing angel wings 86, and opposing flowpath portions 88 (only one angel wing 86 and flowpath portion 88 is shown in FIG. 9D). More particularly, dovetail 82 extends radially inwardly from the substantially planar platform 84, which defines the radially inner boundary of the hot gases of combustion flowing through the LP turbine 30 of the turbofan engine 10. Turbine rotor blade 74 also includes airfoil 80 extending radially outwardly from platform 84. Additionally, blade 74 includes angel wings 86 configured to provide radial sealing between the rotating components coupled to the rotor disk (not shown), e.g., turbine rotor blade 74, and the stationary components (not shown) disposed forward and aft of such rotating components so as to prevent hot gas ingestion within the wheel space (not shown) adjacent to the rotor disk. Further, opposing flowpath portions 88 extend outward from platform 84, e.g., one flowpath portion 88 may be positioned on the forward side 73 of blade 74, extending generally forward from platform 84, and one flowpath portion 88 may be positioned on the aft side 75, extending generally aft from platform 84. As shown in FIG. 9D, angel wings 86 may extend radially inward from the opposing flowpath portions 88 such that angel wings 86 are opposing portions of blade 74. Accordingly, FIG. 9D illustrates rotor blade 74 consists of various three dimensional portions such that blade 74 is defined in three dimensions and has a three dimensional shape.

For the embodiment depicted, turbine rotor blade 74 is comprised of a ceramic matrix composite (CMC) material, which is a non-metallic material having high temperature capability. Exemplary CMC materials utilized for such rotor blades 74 may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and ATK-COI's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, blade 74 may be formed from a CMC material such as silicon carbide (SiC) or carbon fiber cloth. In some embodiments, each portion of rotor blade 74, i.e., airfoil 80, dovetail 82, platform 84, angel wings 86, and flowpath portions 88, may be made from a CMC material. In other embodiments, some portions of blade 74 may be made from a CMC material and other portions of blade 74 may be made from a different material, e.g., a metal, metal alloy, or the like.

Referring now to the schematic illustration of FIG. 2, in an exemplary embodiment, rotor blade 74 comprises an airfoil portion 80 fabricated from a plurality of plies 90 of a CMC material and a dovetail portion 82 fabricated from a plurality of plies 92 of a CMC material. In one exemplary embodiment, the plurality of dovetail plies 92 may comprise about 100 plies, but other numbers of dovetail plies 92 may be used as well. As shown, the plurality of airfoil plies 90 and dovetail plies 92 extend generally along the radial direction R. To fabricate blade 74, the plurality of plies 90, 92 for forming airfoil 80 and dovetail 82 may be laid up in a first layup tool 100 (FIG. 5). Then, referring to the schematic illustration of FIG. 3, a plurality of plies 94 of a CMC material for fabricating the platform portion 84 of rotor blade 74 may be laid up in first layup tool 100. The plurality of platform plies 94 also extends along the radial direction R.

After laying up in first layup tool 100 plies 90, 92, 94 corresponding to airfoil 80, dovetail 82, and platform 84, the plies are ready for processing, e.g., compaction and curing in an autoclave. In alternative embodiments, airfoil 80, dovetail 82, and platform 84 may be molded as shown in FIG. 4 to form a molded assembly $A_M$, e.g., a preform assembly comprising airfoil, dovetail, and platform portions 80, 82, 84, and then molded assembly $A_M$ may be laid up in first layup tool 100 for processing in an autoclave. In an exemplary processing cycle, three caul sheets may be used—e.g., one on airfoil 80, one on the suction side of dovetail 82, and one on the pressure side of dovetail 82—and a standard autoclave cycle may be used to compact and cure the airfoil, dovetail, and platform portions 80, 82, 84 or plies 90, 92, 94 of rotor blade 74. In such a cycle, the airfoil, dovetail, and platform portions or plies are compacted generally along a first direction $D_1$, e.g., generally along the pressure and suction sides of airfoil, dovetail, and/or platform portions 80, 82, 84. In another exemplary cycle, first layup tool 100 includes has pressure side tooling including a caul sheet or a metal tool, and the pressure side tooling provides the compact force during the processing of airfoil, dovetail, and platform portions 80, 82, 84.

Other processing cycles, e.g., utilizing a different number and/or configuration of caul sheets and the like, other known methods or techniques for compacting and/or curing CMC plies, or other configurations of first layup tool 100, may be used as well. As an example, first layup tool 100 could be configured such that the plies are laid up on a pressure side tool and compacted from the suction side or that the plies are compacted from both the pressure side and the suction side. As a further example, the plies may be processed using a melt infiltration process, a chemical vapor infiltration process, use of a matrix of pre-ceramic polymer fired to obtain a ceramic matrix, or any combinations of these or other known processes.

As illustrated schematically in FIG. 6, after airfoil, dovetail, and platform portions 80, 82, 84 have been processed, these portions of rotor blade 74 form a first assembly $A_1$. In one embodiment, pre-formed angel wings 86 and flowpath portions 88 may be laid up with first assembly $A_1$ in a second layup tool 102 (FIG. 8); then, the angel wing 86 and flowpath portion 88 preforms may be processed, e.g., in an autoclave, with first assembly $A_1$ to form a second assembly $A_2$. In another embodiment, angel wing plies 96 and flowpath plies 98 may be laid up with first assembly $A_1$ in second layup tool 102, and then angel wing plies 96 and flowpath plies 98 may be processed, e.g., in an autoclave, with first assembly $A_1$ to form second assembly $A_2$. In exemplary embodiments, a standard autoclave cycle may be used to compact and cure first assembly $A_1$ and angel wing and flowpath preforms or plies. In such a standard cycle, the angel wing and flowpath preform portions 86, 88 or plies 96, 98 are compacted generally along a second direction $D_2$ and may also be compacted along a third direction $D_3$, as shown in FIG. 8. That is, the compaction force may be applied along second direction $D_2$ as well as third direction $D_3$. Second direction $D_2$ is orthogonal, i.e., perpendicular, to third direction $D_3$, and each of second direction $D_2$ and third direction $D_3$ are orthogonal to first direction $D_1$. After processing, i.e., following the second processing cycle to bond angel wings 86 and flowpath portions 88 to the airfoil, dovetail, and platform portions 80, 82, 84 of blade 74, second assembly $A_2$ may be machine finished to form a finished turbine rotor blade 74.

As shown in FIG. 6, first assembly $A_1$ may define a first plane that includes the radial direction R and a blade direction B. It should be understood that airfoil, dovetail, and platform plies 90, 92, 94 extend parallel to the first plane. Further, as depicted schematically in FIG. 7, angel wing plies 96 and/or flowpath plies 98 may define a second plane including the radial direction R and a flow direction F, and each ply 96, 98 generally may extend within or parallel to the second plane. Second plane may be substantially normal to the first plane defined by first assembly $A_1$. Thus, rotor blade 74 may be formed from plies in three dimensions, i.e., airfoil, dovetail, and platform plies 90, 92, 94 extending within or parallel to the first plane and angel wing and flowpath plies 96, 98 extending within or parallel to the second plane, normal to the first plane.

By processing blade 74 in at least two steps, compaction of the plies can be improved. For example, processing airfoil, dovetail, and platform plies 90, 92, 94 in first layup tool 100 to form first assembly $A_1$ may allow optimal or improved compaction of these plies within or parallel to the first plane. Then, processing first assembly $A_1$ with angel wing plies 96 and flowpath plies 98 may allow optimal or improved compaction of these plies within or parallel to the second plane, as well as blade 74 overall. As one particular example, because the majority of the plies forming blade 74 are the airfoil and dovetail plies 90, 92, processing these portions of blade 74 first can function as an intermediate debulking step, such that the overall processing time and required compaction can be reduced. Further, separating the processing of airfoil, dovetail, and platform portions 80, 82, 84 from the processing of angel wing and flowpath portions 86, 88 can simplify the tooling required for processing blade 74. That is, the tooling required to process blade 74 in one cycle can be more complicated than the tooling used to process blade 74 in two or more steps, e.g., first layup tool 100 and second layup tool 102.

Additionally or alternatively, because the airfoil, dovetail, and platform portions 80, 82, 84 are processed before the angel wings 86 and flowpath portions 88, the airfoil, dovetail, and platform portions 80, 82, 84 are stiffer during the second processing cycle than they would be if the entire blade was processed in a single cycle. That is, the airfoil, dovetail, and platform portions 80, 82, 84 are stiffer when angel wings 86 and flowpath portions 88 are bonded to the other portions of blade 74 through application of a compaction force normal to the airfoil, dovetail, and platform portions 80, 82, 84. Thus, the airfoil, dovetail, and platform portions 80, 82, 84 are less susceptible to undesirable deformation during the second processing cycle.

FIGS. 9A-9D illustrate the stages of fabrication of an exemplary rotor blade 74. FIG. 9A illustrates molded assembly $A_M$, comprising airfoil, dovetail, and platform portions 80, 82, 84 of blade 74. FIG. 9B depicts first assembly $A_1$, i.e., molded assembly $A_M$ post-processing. FIG. 9C illustrates second assembly $A_2$, comprising airfoil, dovetail, platform, angel wing, and flowpath portions 80, 82, 84, 86, 88 of blade 74 following a second processing cycle. FIG. 9D depicts a finished blade 74, i.e., blade 74 post-machining.

FIG. 10 illustrates an exemplary method 1000 for fabricating a CMC component of a gas turbine engine, such as LP turbine rotor blades 74. At step 1002, a material, such as a CMC material as described above, is molded to form a first portion of the gas turbine engine component. In embodiments in which the gas turbine engine component formed using method 1000 is a turbine rotor blade such as blade 74, the first portion may be molded assembly $A_M$, comprising airfoil, dovetail, and platform portions 80, 82, 84 as described above. An exemplary molded assembly $A_M$ is shown in FIG. 9A. In other embodiments, the first portion may be any portion of the gas turbine engine component, but typically, the first portion is only a portion of the gas turbine engine component rather than the entire component.

At step 1004, the first portion is prepared for processing. For example, the first portion may be positioned on a first layup tool to prepare the first portion for processing. Continuing with the above example, where the first portion is molded assembly $A_M$, in one embodiment the first portion may be laid up on first layup tool 100 to prepare the first portion for processing. The first layup tool, e.g., first layup tool 100, may have any appropriate shape and configuration for supporting the first portion and/or aiding in the processing of the first portion. Other techniques or methods also may be used to prepare the first portion for processing.

After the first portion is prepared for processing, as shown at 1006, the first portion is processed to form a first assembly. As an example, the first portion may be processed to form the first assembly by curing in an autoclave. Alternatively or additionally, the first portion may be compacted in an autoclave as part of processing the first portion to form the first assembly. Continuing with the foregoing example, as previously described, molded assembly $A_M$ may be processed using a standard cycle in an autoclave, including compaction along the first direction $D_1$ and curing at an appropriate temperature and pressure. Processing molded assembly $A_M$ forms first assembly $A_1$, comprising airfoil 80, dovetail 82, and platform 84 of turbine rotor blade 74. An exemplary first assembly $A_1$ is illustrated in FIG. 9B.

At step 1008, the first assembly and a second portion of the gas turbine engine component are prepared for processing. In one embodiment, the first assembly and the second portion may be positioned on a second layup tool to prepare the first assembly and the second portion for processing. In the above example, where the first assembly is first assembly $A_1$, the second portion may be angel wings 86 and flowpath portions 88. In such embodiments, positioning the first assembly and second portion on a second layup tool may comprise laying up first assembly $A_1$ and pre-formed angel wings 86 and flowpath portions 88 on second layup tool 102. Alternatively, preparing the first assembly and second portion for processing may comprise laying up first assembly $A_1$, angel wing plies 96, and flowpath plies 98 on second layup tool 102. The second layup tool may have any appropriate shape and configuration for supporting the first assembly and second portion and/or aiding in the processing of the first assembly and second portion.

In some embodiments, first assembly $A_1$ may define a first plane and the second portion, e.g., angel wing 86 or flowpath 88 preforms or plies 96, 98, may define a second plane. Preparing first assembly $A_1$ and the second portion for processing may include positioning the second portion adjacent the first assembly $A_1$ on a second layup tool such that the second plane extends perpendicular to the first plane. The positions of first assembly $A_1$ and the second portion are depicted in FIGS. 6 and 7. Other techniques or methods also may be used to prepare the first assembly and the second portion for processing.

After being prepared for processing, as shown at 1010, the first assembly and second portion are processed to join or bond the first assembly and second portion and thereby form a second assembly. For example, the first assembly and the second portion may be cured in an autoclave to form the second assembly. Alternatively or additionally, the first assembly and second portion may be compacted in an autoclave as part of processing to form the second assembly. In one embodiment, the first assembly and second portion may be processed in an autoclave using a standard cycle, including applying a compaction force to the second portion along a second direction $D_2$ and/or a third direction $D_3$ and curing the assembly at an appropriate temperature and pressure. Continuing with the above example, the first direction $D_1$, second direction $D_2$, and third direction $D_3$ may be orthogonal to each other, i.e., the first direction $D_1$ may be perpendicular to the second direction $D_2$, the second direction $D_2$ may be perpendicular to the third direction $D_3$, and the third direction $D_3$ may be perpendicular to the first direction $D_1$. The second portion, which may be angel wing 86 and flowpath portion 88 preforms or angel wing plies 96 and flowpath plies 98, such that processing first assembly $A_1$ and the second portion forms second assembly $A_2$, comprising airfoil 80, dovetail 82, platform 84, angel wings 86, and flowpath portions 88 of turbine rotor blade 74 as previously described. That is, the pre-formed angel wings 86 and flowpath portions 88, or angel wing plies 96 and flowpath plies 98, may be bonded to first assembly $A_1$ to form second assembly $A_2$. An exemplary second assembly $A_2$ is shown in FIG. 9C.

At step 1012, the second assembly may be machined to produce the finished gas turbine engine component. Continuing with the foregoing example, second assembly $A_2$ may be machined to form a finished turbine rotor blade 74. An exemplary machine finished turbine rotor blade 74 is depicted in FIG. 9D.

While described above with respect to fabricating LP turbine rotor blade 74, it should be readily understood that method 1000 also may be used to fabricate other gas turbine engine components. As one example, method 1000 may be used to form HP turbine rotor blades 70, as well as other components of turbofan engine 10. Other gas turbine engine components may comprise CMC plies extending within or parallel more than two planes or requiring compaction along a plurality of directions. Accordingly, the layup tools or other tooling used to process the component may have an appropriate configuration for supporting the component during processing, and method 1000 may be adjusted to have any appropriate or desirable number of processing steps.

FIG. 11 illustrates another exemplary method 1100 for fabricating a component of a gas turbine engine, such as LP turbine rotor blades 74. At step 1102, a first plurality of plies is prepared for processing. The first plurality of plies may comprise plies of a CMC material, such as the CMC materials described above. Further, as previously described, the first plurality of plies may comprise airfoil plies 90 and dovetail plies 92, as well as platform plies 94, for forming turbine rotor blade 74. In an exemplary embodiment, the first plurality of plies are positioned on a first layup tool to prepare the first plurality of plies for processing. For example, airfoil plies 90 and dovetail plies 92 may be laid up on first layup tool 100, and then platform plies 94 may be laid up on first layup tool 100. As previously described, the first layup tool, e.g., first layup tool 100, may have any appropriate shape and configuration for supporting the first plurality of plies and/or aiding in the processing of the first plurality of plies. Further, in other embodiments, the first plurality of plies may be plies for forming another component of a gas turbine engine. Other ways of laying up the plies and otherwise preparing the first plurality of plies for processing may be used as well.

At step 1104, the first plurality of plies is processed to form a first assembly. As an example, the first plurality of plies may be cured in an autoclave to form the first assembly. Alternatively or additionally, the first plurality of plies may be compacted in an autoclave as part of processing the first plurality of plies to form the first assembly. Continuing with the above example, where the first plurality of plies includes airfoil plies 90, dovetail plies 92, and platform plies 94 of turbine rotor blade 74, the plies may be processed using the previously described standard autoclave cycle, including applying a compaction force along the first direction $D_1$ and curing at an appropriate temperature and pressure. Processing plies 90, 92, 94 forms first assembly $A_1$, comprising airfoil 80, dovetail 82, and platform 84 of blade 74. An exemplary first assembly $A_1$ is illustrated in FIG. 9B.

At step 1106, the first assembly and a second plurality of plies are prepared for processing. In one embodiment, the first assembly and the second plurality of plies may be positioned on a second layup tool to prepare the first assembly and the second plurality of plies for processing. Continuing with the foregoing example, where the first assembly is first assembly $A_1$, the second plurality of plies may be angel wing plies 96 and flowpath plies 98. In such embodiments, preparing the first assembly and second plurality of plies for processing may comprise laying up first assembly $A_1$, angel wing plies 96, and flowpath plies 98 on second layup tool 102. First assembly $A_1$ may define a first plane and the second plurality of plies, e.g., angel wing and flowpath plies 96, 98, may define a second plane. Preparing first assembly $A_1$ and the second plurality of plies for processing may include positioning plies 96, 98 adjacent first assembly $A_1$ on second layup tool 102 such that the second plane extends perpendicular to the first plane. The positions of first assembly $A_1$ and the second plurality of plies are depicted in FIGS. 6 and 7. Further, as described with respect to method 1000, the second layup tool, e.g., second layup tool 102, may have any appropriate shape and configuration for supporting the first assembly and the second plurality of plies and/or aiding in the processing of the first assembly and the second plurality of plies. Other ways or methods also may be used to prepare the first assembly and the second plurality of plies for processing.

After being prepared for processing, as shown at 1108, the first assembly and second plurality of plies are processed to join or bond the first assembly and second plurality and thereby form a second assembly. For example, the first assembly and the second plurality of plies may be cured in an autoclave to form the second assembly. Alternatively or additionally, the first assembly and second plurality of plies may be compacted in an autoclave as part of processing to form the second assembly. In one embodiment, the first assembly and second plurality of plies may be processed in an autoclave using a standard cycle, including compacting the second plurality of plies along a second direction $D_2$ and/or a third direction $D_3$ and curing the assembly at an appropriate temperature and pressure. Where processing the first assembly and second plurality of plies follows processing the first plurality of plies by applying a compaction force along the first direction $D_1$, the first direction $D_1$, second direction $D_2$, and third direction $D_3$ may be orthogonal to each other. That is, the first direction $D_1$ may be perpendicular to the second direction $D_2$, the second direction $D_2$ may be perpendicular to the third direction $D_3$, and the third direction $D_3$ may be perpendicular to the first direction $D_1$.

In the above example, where the first assembly is first assembly $A_1$ and the second plurality of plies includes angel wing plies 96 and flowpath plies 98, processing first assembly $A_1$ and the second plurality of plies forms second assembly $A_2$, comprising airfoil 80, dovetail 82, platform 84, angel wings 86, and flowpath portions 88 of turbine rotor blade 74 as previously described. That is, the angel wing plies 96 and flowpath plies 98 may be joined or bonded to first assembly $A_1$ to form second assembly $A_2$. An exemplary second assembly $A_2$ is shown in FIG. 9C.

At step 1110, the second assembly may be machined to produce the finished gas turbine engine component. Continuing with the foregoing example, second assembly $A_2$ may be machined to form a finished turbine rotor blade 74. An exemplary machine finished turbine rotor blade 74 is depicted in FIG. 9D.

Although described above with respect to fabricating LP turbine rotor blade 74, it should be readily understood that method 1100 also may be used to fabricate other gas turbine engine components. As one example, method 1100 may be used to form HP turbine rotor blades 70, as well as other components of turbofan engine 10. Further, as previously described, other gas turbine engine components may comprise CMC plies extending within or parallel more than two planes or requiring compaction along a plurality of directions. Accordingly, the layup tools or other tooling used to process the component may have an appropriate configuration for supporting the component during processing, and method 1100 may be adjusted to have any appropriate or desirable number of processing steps.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for fabricating a ceramic matrix composite component of a gas turbine engine, the method comprising:
   molding a plurality of plies of a ceramic matrix composite material to form a first portion of the gas turbine engine component, wherein the first portion of the gas turbine engine component comprises an airfoil, a dovetail, and a platform of a turbine rotor blade, and wherein the plurality of plies in the airfoil, the dovetail, and the platform extend parallel to a first plane;
   processing the first portion of the gas turbine engine component to form a first assembly;
   preparing the first assembly and a second portion of the gas turbine engine component for processing; and
   processing the first assembly and second portion of the gas turbine engine component to join the first assembly and the second portion and thereby form a second assembly.

2. The method of claim 1, wherein the first assembly defines the first plane and the second portion defines a second plane, and wherein preparing the first assembly and the second portion for processing comprises positioning the second portion adjacent the first assembly on a second layup tool such that the second plane extends perpendicular to the first plane.

3. The method of claim 2, wherein the second portion of the gas turbine engine component comprises angel wings and a flowpath portion of a turbine rotor blade, wherein the angel wing comprises angel wing plies and the flowpath portion comprises flowpath plies extending parallel to the second plane.

4. The method of claim 2, wherein the first plane comprises a radial direction and a blade direction of the gas turbine engine and the second plane comprises the radial direction and a flow direction of the gas turbine engine.

5. The method of claim 4, wherein the plurality of plies extend along radial direction of the gas turbine engine.

6. The method of claim 1, further comprising positioning the first portion of the gas turbine engine component on a first layup tool to prepare the first portion for processing.

7. The method of claim 1, wherein processing the first portion of the gas turbine engine component comprises compacting the first portion in an autoclave.

8. The method of claim 1, wherein processing the first portion of the gas turbine engine component comprises curing the first portion in an autoclave.

9. The method of claim 1, wherein processing the first assembly and the second portion of the gas turbine engine component comprises compacting the first assembly and the second portion in an autoclave.

10. The method of claim 1, wherein processing the first assembly and the second portion of the gas turbine engine component comprises curing the first assembly and the second portion in an autoclave.

11. The method of claim 1, wherein processing the first portion of the gas turbine engine component comprises compacting the first portion along a first direction, and wherein processing the first assembly and the second portion of the gas turbine engine component comprises compacting the second portion along a second direction, wherein the first direction and second direction are perpendicular to one another.

12. A method for fabricating a ceramic matrix composite component of a gas turbine engine, comprising:
   positioning a first plurality of plies of a ceramic matrix composite material on a first layup tool to prepare a first plurality of plies for processing, wherein the first plurality of plies comprises airfoil plies, dovetail plies, and platform plies of a turbine rotor blade, and wherein the positioning comprises laying up the airfoil plies, dovetail plies, and platform plies extending along a radial direction of the gas turbine engine;
   processing the first plurality of plies to form a first assembly;
   positioning the first assembly and a second plurality of plies of a ceramic matrix composite material on a tool for processing the first assembly and the second plurality of plies, the first assembly defining a first plane, the second plurality of plies defining a second plane, wherein the second plane is perpendicular to the first plane; and
   processing the first assembly and the second plurality of plies to join the first assembly and the second plurality of plies and thereby form a second assembly.

13. The method of claim 12, wherein processing the first plurality of plies comprises compacting the first plurality of plies in an autoclave.

14. The method of claim 12, wherein processing the first plurality of plies comprises curing the first plurality of plies in an autoclave.

15. The method of claim 12, wherein positioning the first assembly and the second plurality of plies on the tool comprises laying up the first assembly and the second plurality of plies on a second layup tool.

16. The method of claim 12, wherein processing the first assembly and the second plurality of plies comprises compacting the first assembly and the second plurality of plies in an autoclave.

17. The method of claim 12, wherein processing the first assembly and the second plurality of plies comprises curing the first assembly and the second plurality of plies in an autoclave.

18. The method of claim 12, wherein the second plurality of plies comprises angel wing plies and flowpath plies of a turbine rotor blade.

19. The method of claim 12, wherein processing the first plurality of plies comprises compacting the first plurality of plies along a first direction, and wherein processing the first assembly and the second plurality of plies comprises compacting the second plurality of plies along a second direction, wherein the first direction and second direction are perpendicular to one another.

20. The method of claim 12, wherein the first plane comprises the radial direction and a blade direction of the gas turbine engine and the second plane comprises the radial direction and a flow direction of the gas turbine engine.

* * * * *